(12) United States Patent
Sabados

(10) Patent No.: US 6,871,363 B2
(45) Date of Patent: Mar. 29, 2005

(54) SHOCK ABSORBING SAFETY FLOOR AND MODULAR TILE FOR SWIMMING POOLS

(76) Inventor: Jeff Richard Sabados, 68 Monticello Dr., Brunswick, OH (US) 44212

( * ) Notice: Subject to any disclaimer, the term of this patent is extended or adjusted under 35 U.S.C. 154(b) by 0 days.

(21) Appl. No.: 10/393,539

(22) Filed: Mar. 20, 2003

(65) Prior Publication Data

US 2003/0177729 A1 Sep. 25, 2003

Related U.S. Application Data

(60) Provisional application No. 60/366,166, filed on Mar. 21, 2002.

(51) Int. Cl.[7] ................................................. E04H 4/00
(52) U.S. Cl. .................. 4/506; 4/580; 4/583; 52/403.1; 52/177
(58) Field of Search ............................ 52/403.1, 177, 52/169.7, 410; 428/423.9, 424.2, 423.1; 472/92; 4/506, 496, 504, 488, 580, 583

(56) References Cited

U.S. PATENT DOCUMENTS

| | | | |
|---|---|---|---|
| 2,999,431 A | * 9/1961 | Mitchell | 472/92 |
| 3,114,940 A | * 12/1963 | Higginbotham et al. | 267/153 |
| 4,287,693 A | * 9/1981 | Collette | 52/177 |
| 5,190,799 A | * 3/1993 | Ellingson, III | 428/53 |
| 5,303,669 A | * 4/1994 | Szekely | 116/205 |
| 5,749,787 A | * 5/1998 | Jank | 472/92 |
| 6,061,980 A | * 5/2000 | Poiencot | 52/177 |
| 6,589,631 B1 | * 7/2003 | Suzuki et al. | 428/172 |
| 2002/0092252 A1 | * 7/2002 | Kettler et al. | 52/403.1 |

* cited by examiner

Primary Examiner—Carl D. Friedman
Assistant Examiner—Chi Q. Nguyen

(57) ABSTRACT

A shock absorbing safety floor comprising tile minimizes injury by absorbing the energy created when a portion of a diver's body impacts the bottom or sides of the pool. By absorbing a portion of the energy at impact, the floor decreases the amount of energy absorbed by the diver's body thereby subsequently minimizing injury to the diver. The shock absorbing safety floor compresses to absorb the energy.

13 Claims, 4 Drawing Sheets

SHOCK ABSORBING SAFETY FLOOR AND MODULAR TILE FOR SWIMMING POOLS

This application relates to and claims the filing date of U.S. provisional patent application Ser. No. 60/366,166 filed Mar. 21, 2002.

The application received no federal research and development funding.

BACKGROUND OF THE INVENTION

More than 850 permanent spinal related injuries result from diving accidents every year, according to the American Spinal Injury Association. One-third of these occur in swimming pools. Common injuries associated with diving accidents include spinal injuries and brain damage sometimes resulting in death. According to Dr. David Grossman, director of the Harborview Injury Prevention Research Center, "[T]he typical scenario leading to spinal injury involves simple misjudgment. There could be any number of reasons for the misjudgment—a person is intoxicated, the pool isn't marked or markings are ignored, they're too young, etc. But what happens when a diver hits the bottom of the pool is there will most likely be an impact to the head, right on the skull, that leads to a compression fracture of the spine, which is where the bone is—basically like a car hitting a wall. It just crushes onto itself and usually leads to a spinal-cord injury". Additionally, the damage that occurs to spinal axons within the first few hours after injury is complex and it occurs in stages. The normal blood flow is disrupted, which causes oxygen deprivation to some of the tissues of the spinal cord. Bleeding into the injured area leads to swelling, which can further compress and damage spinal cord axons, the long, thin strings of nerve cell cytoplasm that carry electrical signals up and down the spinal cord. Over time, these and other events can contribute to more tissue degeneration and a greater loss of function.

Many of the injuries are not the fault of misjudgment but of bad swimming pool design. The current industry standards for depth, length and width of swimming pools are still too shallow of a depth for diving. Likewise, the transition slope, from the deep end to the shallow end of the pool is too sharp, resulting in the deep and shallow ends being too close to one another.

For swimming pools with diving boards, the Red Cross prefers a depth under the board of 11.5 feet, and 16.5 feet from the tip of the board to the transition slope. The YMCA has similar guidelines. Both groups advise homeowners not to allow diving, or to remove the boards, if their pool is less than this depth. The current National Spa and Pool Institute (NSPI) minimum depth is 7.5 feet, with 7 feet from the tip of the board to the transition slope. NSPI contest that this standard is safe if "properly used". By proper use, the diver must "steer up" upon broaching the water to avoid the transition slope. When divers don't steer up, and when the transition slope is too sharp (less than the greater standard of 16.5 feet) they hit the bottom and injure themselves.

To further expose this problem, in the early '90s, John Wingfield, who coaches U.S. Olympic hopefuls, did a study for the U.S. Consumer Product Safety Commission, videotaping exactly what happens when people dive. When a pool's dimensions are within NSPI, divers, even while "steering up" could hit the transition slope at a speed high enough to cause catastrophic head and spinal injuries.

Not only do transition slopes present a danger, but also insufficient water depth. Although there might be "no diving" signs posted, in a study of diver awareness, the majority of divers failed to notice the sign or disregarded the sign. Statistical analyses show that the vast majority of accidents occur in water depths of about 3½ feet or less. People diving from the side of the pool enter the water at approximately 15 feet/sec. At this rate of speed, estimates of the point where downward motion ceases is around 12 feet, which is 8 feet deeper than the average depth at the shallow end of most pools. Divers who do not "steer up" will impact a four feet deep bottom at 10 feet/sec or greater.

John Wingfield believes that cost is probably the main reason that pools have not been redesigned. This invention allows an additional safety measure to be installed, providing a more cost efficient means to increased safety.

U.S. Pat. No. 3,997,924 issued to Jewitt is directed towards a swimming pool with an auxiliary fracturable floor for breaking a fall of a diver in an unduly rapid descent. In Jewitt, the bottom of the pool is equipped with chambers that may fracture to absorb energy when a diver dives into the bottom of the pool.

Currently, there are no swimming pool safety products that provide diver safety through a shock absorbing safety floor or modular tile. This invention provides a cost efficient means to increase the safety factor of swimming pools.

BRIEF SUMMARY OF THE INVENTION

Although particular embodiments of the invention have been described and illustrated it will be apparent to one skilled in the art that numerous modifications and variations can be implemented without departing from the basic concept. It is to be understood, however, that such modifications and variations will fall within the full scope of the invention as defined by the claims following the subsequent discussion of the invention.

The swimming pool safety floor and modular tile is a safety device placed on the bottom of swimming pools to absorb energy created by impacting a bottom of a pool. The complete system conforms to any existing pool by covering the entire pool or areas designated as high risk to diver injury which include bottoms under diving boards and slides, upward sloping contours and shallow water areas. This safety device can be an entire floor or a modular tile installed to reduce the impact of a diver broaching the water and hitting the bottom of the pool at such a speed or manner to cause bodily injury. The complete system provides a reduction of the amount of force experienced at impact, while retaining a rigid, substantially non-compliant configuration during normal use.

Normally, swimming pools have concrete or cement tile floors that do not effective absorb impact. An object of this invention is to absorb impact with a safety device at the bottom of swimming pools in order to reduce the amount of injury when diving from a diving board or the side of the pool. Additionally, this invention can provide safety to swimmers using a slide. The floor embodiment of the invention conforms to existing pools or areas designated as high risk. The area identified as high risk to diving injury or the entire pool can be covered with the safety floor or modular tile.

A diver who dives into a pool equipped with the present invention might only chip a spinal vertebrate rather than break their spine and be paralyzed for life. A bruise can cause non-repairable damage to the nervous system; this system will reduce the amount of bruise and subsequent damage incurred. Instead of the human body absorbing all of the impact, this invention will absorb some of the impact.

Polyurethane and rubber offer differing amounts of absorbing properties and are the preferred material to construct the tiles; other materials having similar physical and chemical characteristics may be utilized to construct the tiles. Those characteristic properties include a waterproof, non-toxic, rigid cushioning material that will absorb shock through compression when impacted.

The invention is directed towards a floor or modular tile installed in any size swimming pool for any size area. Additionally, this invention absorbs shocks through compression of the tile. Thereafter, the floor or modular tile recovers to its original shape without fracturing.

DETAILED DESCRIPTION OF THE INVENTION

In one embodiment, the shock absorbing safety device floor can be manufactured and rolled, such as a roll of carpet. The shock absorbing safety device modular tile will come in separate tiles that will inter-connect and inter-lock with similar tiles.

One design of the safety floor or modular tile will be single density polyurethane or rubber.

Another design of the safety floor or modular tile will be dual material having different densities such as polyurethane and rubber.

A third design of a safety floor or modular tile will consist of an upper plate made of polyurethane or rubber. A section is located between the upper plate and bottom to specifically reduce impact. This section will be rigid polyurethane foam to primary absorb shock while having a structure that connects the top surface plate to the bottom plate.

An additional feature will incorporate a bottom plate to secure the absorbing sections. This bottom plate secures to the absorbing sections with glue or fittings. There are holes in the absorbing sections to access the installation screws to secure the bottom plate to the floor of the pool. The securing pan head screws are flush with the bottom plate. The bottom plate has a density greater than that of water and is thereby heavy enough to ensure that the entire floor or modular tiles rest on the bottom.

Each floor or modular tile is malleable and flexible to conform to different sloping contours. Modifications to the design are made to allow for drains with minimum loss of shock absorbing ability. Each modular tile is inter-connecting and inter-locking that it keeps the tile firmly in place. Different designs inter-lock and inter-connect with other designs. The top surface on all designs is a textured crossrib or raised square design to provide feet a comfortable, non-slip surface. The modular tile embodiment of the invention may be of convenient installation tile size (i.e. 3–6 ft by 3–6 ft). The height of the tile will typically be between ½ inch and 2 inches. The floor or modular tile is loaded with anti-microbial chemical fighting mold, mildew and bacteria.

Figure 1A:
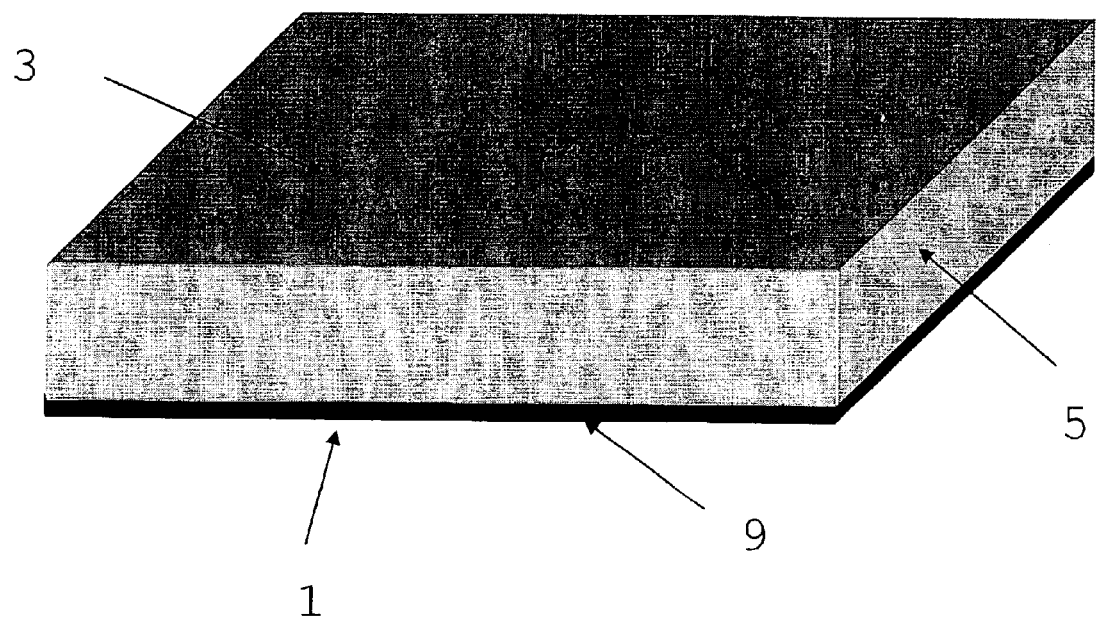
FIG. 1A is a perspective view of a single material design.

FIG. 1A depicts a single material design tile 1 comprising either rubber or polyurethane. An upper surface of the tile includes a cross-rib or raised square non-slip surface 3. A first energy absorbing layer 5 comprises either rubber or polyurethane. A securing bottom 9 is optional in this embodiment. The interconnecting and interlocking ends are not shown in this figure for ease in understanding the invention. The floor and modular tile will preferably be between ½ and 2 inches in height and will be between 3 to 6 feet in length by 3 to 6 feet in width.

Figure 1B:
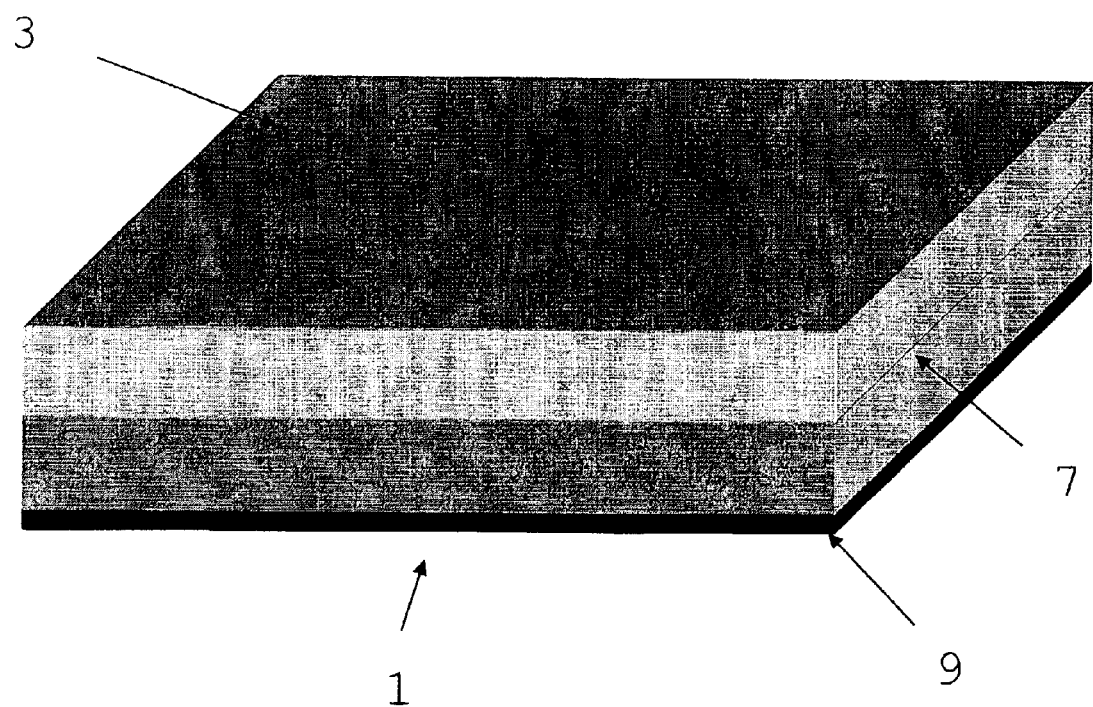
FIG. 1B is a perspective view of a two material design with each material comprising a different density.

FIG. 1B depicts a two section dual material design having different densities for each section. This design takes advantage of the compression abilities of different materials with different densities. In this embodiment, the tile 1 includes a non-slip surface 3 and two energy absorbing sections 5 and 7. The energy absorbing sections may include rubber and polyurethane. A securing bottom 9 may also be included in this embodiment.

Figure 1C:
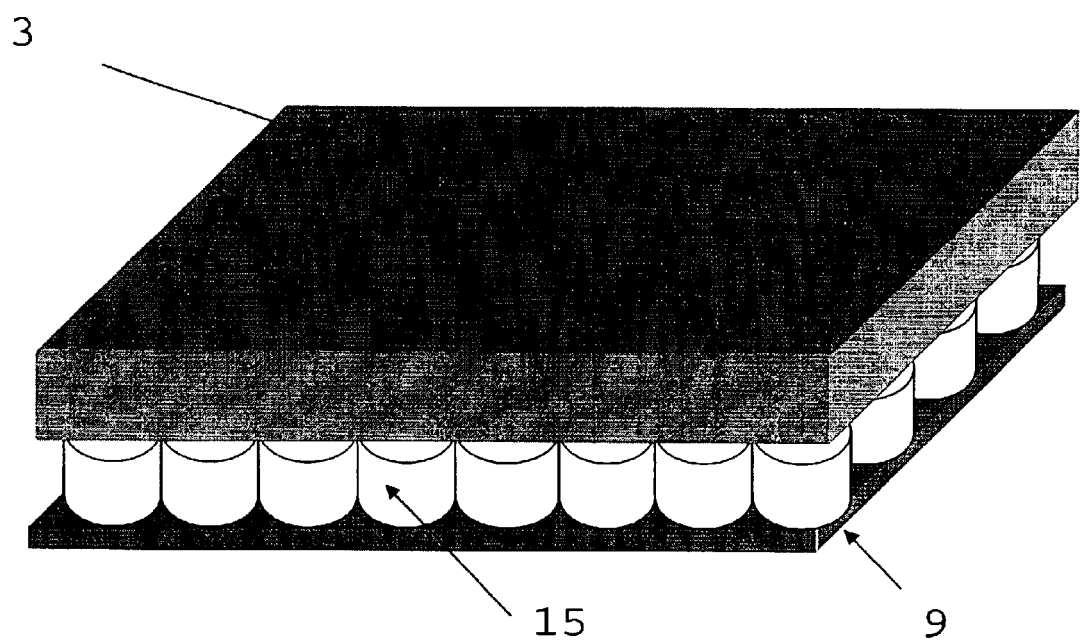
FIG. 1C is a perspective view of a design including columnar regions of a shock absorbing materials.

FIG. 1C depicts a design having columnar shaped energy absorbing sections 15. The energy absorbing sections 15 may comprise rigid polyurethane foam with supportive structure connecting the upper rubber or polyurethane top section with the bottom section. This embodiment of the invention may include the securing bottom 9 as shown.

Figure 2:
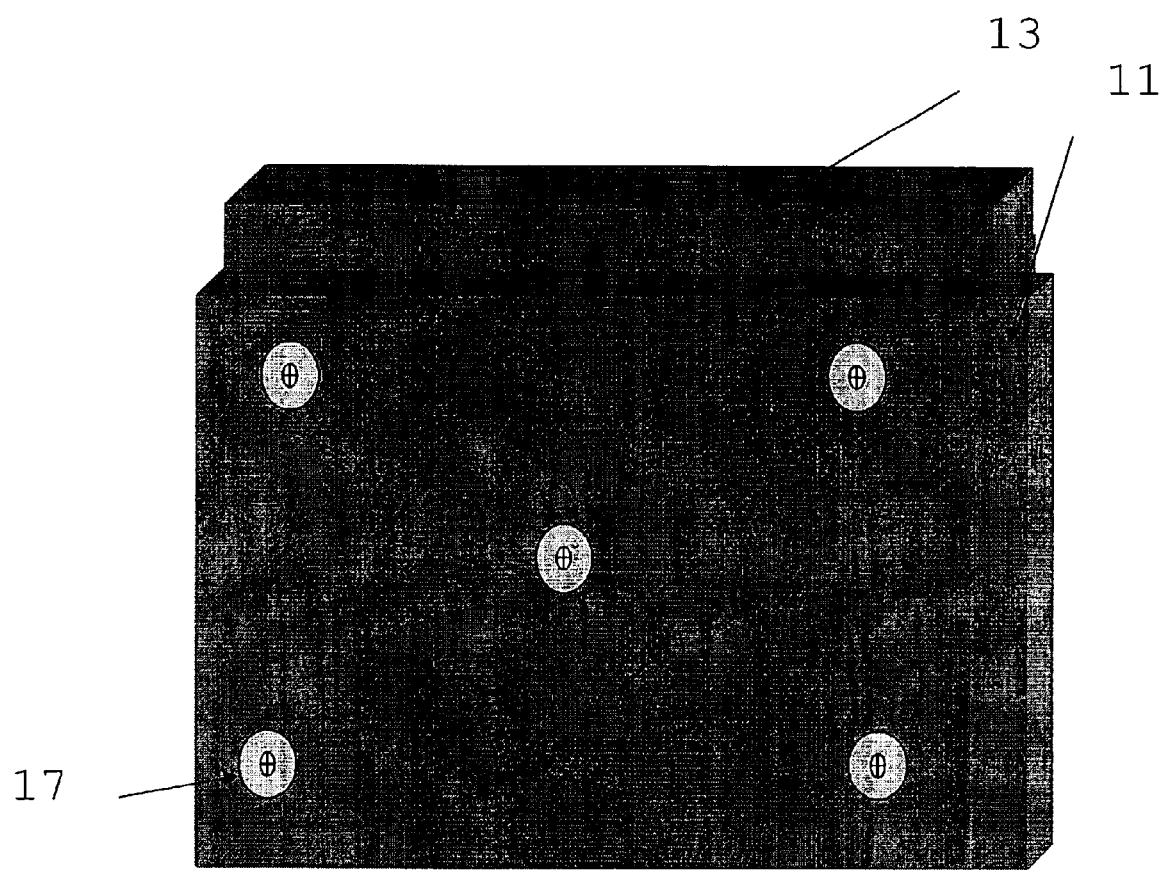
FIG. 2 is an overhead view of a securing bottom for the tile.

FIG. 2 depicts tiles 1 having interlocking and interconnecting edges 11 and 13. A top interlocking edge 11 interconnects with a bottom interlocking edge 13 from an adjacent tile. Holes 17 allow fastening devices (not shown) to be passed through to secure the tiles to the floor of the pool. In the preferred embodiment, the fastening devices comprise pan head screws. The screws are flush with the securing bottom 7 to maximize the protective structure of the complete safety device. The upper and bottom interlocking and interconnecting ends 11 and 13 are depicted with one end being on the bottom and one end being on the top, however it is contemplated that various shapes may be utilized to interconnect the tiles together.

Figure 3A:
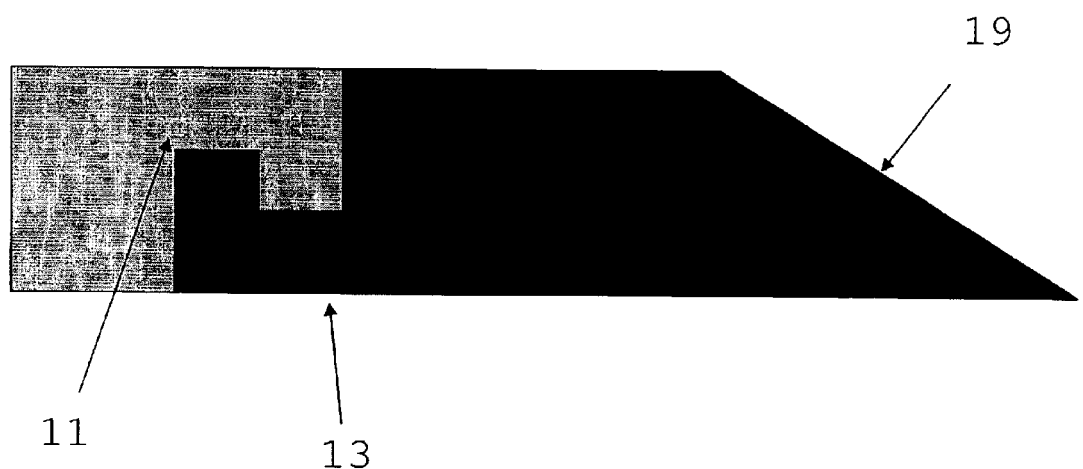
FIG. 3A is a cross-sectional view of an accessory end piece that shows the interlocking edges.

FIG. 3A depicts an accessory end piece 19 that minimizes the opportunity of injury caused with an uneven floor. The end piece 19 provides a slope from on top of the safety floor or modular tile to the (cement) floor of the pool. This figure additionally depicts how the bottom and top interlocking and interconnecting ends are constructed and connect. This design ensures a tight, continuous fitting while still using the same materials to absorb shock. Additionally, this design limits the amount of debris caught in the ends of the tile.

Figure 3B:
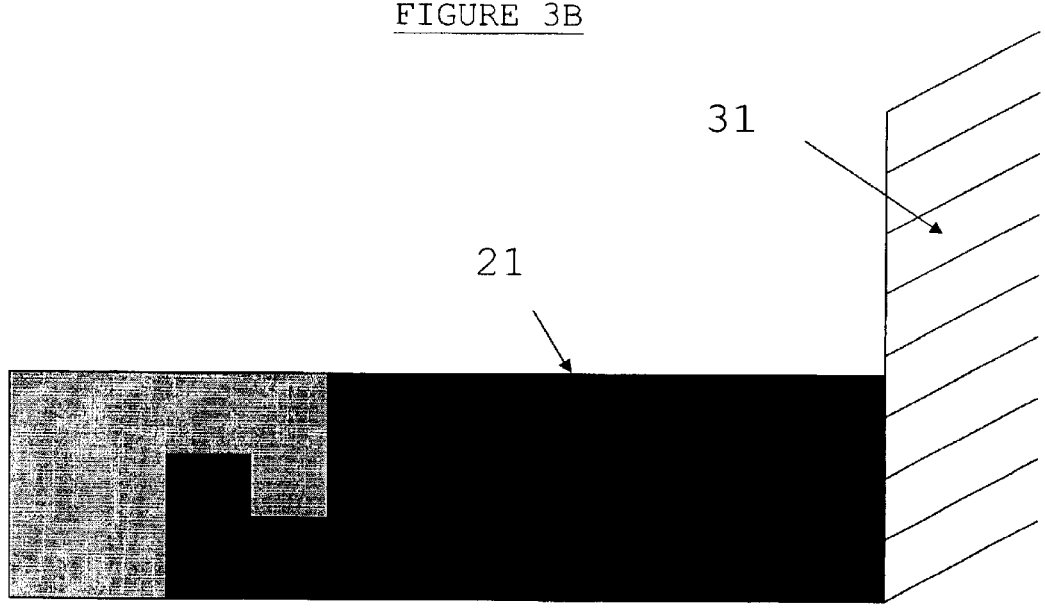
FIG. 3B is a cross-sectional view of an accessory end piece for flush placement against the side of the swimming pool.

FIG. 3B depicts an accessory end piece 21 for flush placement against the side of the swimming pool 31. This end piece 21 will eliminate a "hole" created with the space between an installed safety floor or modular tile and the swimming pool wall 31.

It should be noted that the arrangement of elements may be alternated such that different materials and elements that serve the same function and purpose as those discussed above may be substituted to implement the invention. It is to be understood that the invention is not limited to the exact construction illustrated and described above. Various changes and modifications may be made without departing from the spirit and the scope of the invention as defined in the following claims.

I claim:

1. A shock absorbing floor attached to a bottom of a pool comprising:

modular tiles that comprise a waterproof, rigid cushioning material that recovers to an original shape after being impacted by a diver, each tile including at least one interlocking edge that interconnects with other tiles located substantially adjacent to each tile.

2. The shock absorbing floor of claim 1 wherein said modular tiles further include a non-slip upper surface.

3. The shock absorbing floor of claim 1 wherein said modular tile comprises:

material consisting of one or more selected from the group consisting of rubber and polyurethane.

4. The shock absorbing floor of claim 1 further comprising:

a securing bottom having an upper and lower surface and affixed to a bottom of a swimming pool, said securing bottom including holes for passing fastening devices therethrough for fastening the securing bottom to the bottom of the swimming pool, said lower surface being in contact with the bottom of the swimming pool and said upper surface in contact with an adhesive that contacts a bottom surface of at least one of said modular tiles.

5. The shock absorbing floor of claim 1 wherein said modular tiles further comprises:

an upper surface comprising a non-slip surface;

a layer of polyurethane substantially disposed below said non-slip surface and adhering thereto;

a layer of rubber substantially disposed below said layer of polyurethane and adhering thereto; and, a securing bottom having a density greater than water and comprising holes for passing fastening devices therethrough that fasten the securing bottom to the bottom of the swimming pool, said securing bottom adhering to said layer of rubber and being substantially disposed below said layer of rubber.

6. A shock absorbing floor for a swimming pool, said floor comprising:

an upper layer of non-slip material;

a first middle layer disposed below said upper layer and being adhered thereto, said first middle layer for absorbing energy created when a diver impacts a bottom of a swimming pool during diving; and, a bottom layer disposed below said first middle layer and being adhered thereto, said bottom layer for securing said upper and first middle layer to the bottom of the swimming pool, said bottom layer including holes for passing fastening devices therethrough.

7. The shock absorbing floor of claim 6 further including:

a second middle layer disposed between said first middle layer and said bottom layer, said second middle layer for absorbing energy created when a diver impacts a bottom of a swimming pool during diving.

8. The shock absorbing floor of claim 7 wherein said second middle layer includes columnar shaped elements.

9. A shock absorbing floor attached to a bottom of a swimming pool formed from tiles comprising waterproof, rigid cushioning material that recovers to an original shape after being impacted by a diver, said tiles comprising:

a top layer comprising a non-slip surface; and, a second layer disposed below said top layer and adhering thereto and, said second layer consisting of material selected from one or more of the following rubber or polyurethane or a combination thereof.

10. The shock absorbing floor of claim 9 further comprising:

a securing bottom affixed to a bottom of the pool and attached to said second layer, the securing bottom including at least one hole for passing a fastening device therethrough to fasten the securing bottom to the bottom of the pool.

11. The shock absorbing floor of claim 9 further comprising a third layer sandwiched between said second layer and a securing bottom and affixed thereto.

12. The shock absorbing floor of claim 9 further comprising: rigid polyurethane foam sandwiched between said second layer and a securing bottom.

13. The shock absorbing floor of claim 9 further wherein each tile comprises interlocking ends.

* * * * *